(12) United States Patent
Fryshman

(10) Patent No.: US 9,596,722 B2
(45) Date of Patent: Mar. 14, 2017

(54) INDUCTION COOKING APPARATUS AND METHOD OF USE

(71) Applicant: Bernard Fryshman, Brooklyn, NY (US)

(72) Inventor: Bernard Fryshman, Brooklyn, NY (US)

(73) Assignee: Bernard Fryshman, Brooklyn, NY (US)

( * ) Notice: Subject to any disclaimer, the term of this patent is extended or adjusted under 35 U.S.C. 154(b) by 45 days.

(21) Appl. No.: 14/796,071

(22) Filed: Jul. 10, 2015

(65) Prior Publication Data

US 2015/0319811 A1 Nov. 5, 2015

Related U.S. Application Data

(63) Continuation of application No. 14/078,297, filed on Nov. 12, 2013, now Pat. No. 9,084,299, and a
(Continued)

(51) Int. Cl.
*H05B 6/12* (2006.01)
*H05B 6/06* (2006.01)
(Continued)

(52) U.S. Cl.
CPC .............. *H05B 6/12* (2013.01); *A47J 36/02* (2013.01); *A47J 36/04* (2013.01); *A47J 36/16* (2013.01);
(Continued)

(58) Field of Classification Search
CPC .. H05B 6/105; H05B 6/12; A47J 36/04; A47J 36/02; A47J 36/16; Y10T 29/49119
(Continued)

(56) References Cited

U.S. PATENT DOCUMENTS 3,138,698 A 6/1964 Wells et al.
3,745,290 A * 7/1973 Harnden, Jr. ......... A47J 27/002
219/386
(Continued)

OTHER PUBLICATIONS

Non-Final Office Action on U.S. Appl. No. 14/798,060 mailed Jun. 22, 2016.
(Continued)

*Primary Examiner* — Quang Van
(74) *Attorney, Agent, or Firm* — Foley & Lardner LLP

(57) ABSTRACT

A method of forming a cooking apparatus includes providing a vessel having an inside surface, an outside surface, and a hollow area that is configured to receive food. The method also includes forming a first plurality of ferrous elements to be disposed on an outside of the vessel. The method also includes forming a second plurality of ferrous elements to be disposed in the hollow area of the vessel. The first plurality of ferrous elements and the second plurality of ferrous elements are configured to be heated by electromagnetic radiation from an electromagnetic radiation source, and the first plurality of ferrous elements and the second plurality of ferrous elements are configured to transfer heat to food located in the vessel. The method further includes providing a controller to control movement of at least the first plurality of ferrous elements.

20 Claims, 7 Drawing Sheets

Related U.S. Application Data continuation-in-part of application No. 13/372,654, filed on Feb. 14, 2012, now Pat. No. 9,131,536.

(60) Provisional application No. 61/725,903, filed on Nov. 13, 2012, provisional application No. 61/442,369, filed on Feb. 14, 2011.

(51) Int. Cl.
| | |
|---|---|
| *C23C 16/00* | (2006.01) |
| *A47J 36/16* | (2006.01) |
| *A47J 36/04* | (2006.01) |
| *A47J 36/02* | (2006.01) |
| *H05B 6/10* | (2006.01) |

(52) U.S. Cl.
CPC ......... *H05B 6/105* (2013.01); *Y10T 29/49119* (2015.01)

(58) Field of Classification Search
USPC ....... 219/620–627, 660, 663, 665, 667, 671, 219/676; 99/416, 443 R, 451, DIG. 14, 99/330, 331, 332, 333, 342, 370, 393, 99/385, 403, 448; 220/573.1, 573.2; 126/27, 42, 90 A, 246, 375.1; 427/248.1
See application file for complete search history.

(56) References Cited

U.S. PATENT DOCUMENTS

| | | | |
|---|---|---|---|
| 3,790,735 A | 2/1974 | Peters, Jr. | |
| 4,020,310 A | 4/1977 | Souder et al. | |
| 4,776,386 A | 10/1988 | Meier | |
| 4,999,467 A * | 3/1991 | Iguchi | H05B 6/105 |
| | | | 219/624 |
| 5,053,593 A * | 10/1991 | Iguchi | H05B 6/02 |
| | | | 219/624 |
| 5,366,764 A | 11/1994 | Sunthankar | |
| 5,466,915 A | 11/1995 | Meier et al. | |
| 5,508,498 A | 4/1996 | Rheinish et al. | |
| 5,628,241 A | 5/1997 | Chavanaz et al. | |
| 5,665,263 A | 9/1997 | Gaspard | |
| 6,864,468 B2 | 3/2005 | Kim et al. | |
| 7,170,037 B2 | 1/2007 | Walter | |
| 8,803,045 B2 | 8/2014 | Cadima | |
| 2010/0155391 A1 | 6/2010 | Koschberg et al. | |
| 2014/0238383 A1 | 8/2014 | Armstrong | |

OTHER PUBLICATIONS

Final Office Action received for U.S. Appl. No. 13/372,654 Dtd May 12, 2015.

Non-Final Office Action on U.S. Appl. No. 13/372,654, mailed Jan. 26, 2015.

Non-Final Office Action on U.S. Appl. No. 14/078,297, mailed Mar. 24, 2015.

Notice of Allowance on U.S. Appl. No. 13/372,654, mailed Jul. 8, 2015.

Notice of Allowance on U.S. Appl. No. 14/078,297, mailed May 18, 2015.

International Search Report and Written Opinion issued on PCT/US2016/041871, mailed Nov. 16, 2016.

* cited by examiner

INDUCTION COOKING APPARATUS AND METHOD OF USE

CROSS-REFERENCE TO RELATED APPLICATIONS

The present application is a Continuation of U.S. patent application Ser. No. 14/078,297 filed on Nov. 12, 2013, which is a Continuation-In-Part of U.S. patent application Ser. No. 13/372,654 filed on Feb. 14, 2012, which claims the benefit of U.S. Provisional Patent App. No. 61/442,369 filed on Feb. 14, 2011, each of which is incorporated herein by reference in its entirety. U.S. patent application Ser. No. 14/078,297 also claims the benefit of U.S. Provisional Patent App. No. 61/725,903, filed on Nov. 13, 2012, the entire disclosure of which is incorporated herein by reference in its entirety.

FIELD

The present invention relates generally to the field of equipment for cooking and more particularly to an induction cooking apparatus and a method of induction cooking

BACKGROUND

Induction cooking is similar to other forms of cooking in that it uses a heated cooking vessel such as a pot or a pan to transfer heat to the food contained in the vessel. Induction cooking differs in that the vessel itself is the source of the heat, receiving its energy through electromagnetic radiation which creates the heat in the walls of the vessel. The heat then reaches the food, from the vessel walls inward.

In order to function, the vessel must be made of a ferrous or similar material. Sometimes, an adaptor is used to enable a non-ferrous pot or pan to be used. The adaptor then becomes the source of the heat. Adaptors are sometimes called induction discs.

Despite the developments of the prior art there remains a need for an induction cooking apparatus which provides targeted application of heat.

OBJECTS AND SUMMARY

It is an object of the present invention to provide an induction cooking apparatus which provides targeted heating of food enabling elective cooking of different parts of the food.

Another object of the present invention is to provide a method for induction cooking which provides improved heating uniformity.

Another object of the present invention is to provide an induction cooking apparatus which incorporates pieces of metal of varying sizes and shapes which are distributed within the cooking vessel to vary the heating pattern.

Another object of the present invention is to provide an induction cooking apparatus in which inserts are inserted into food for the purpose of heating and cooking the food.

Yet another object of the present invention is to provide an induction cooking apparatus to incorporate a relatively small of number of component parts which can be manufactured economically in volume, resulting in a low unit cost.

These and other objects and advantages of the present invention will become evident hereinafter.

In accordance with the present invention, an induction cooking apparatus includes a cooking vessel, a support structure, and a plurality of ferrous elements which are placed throughout the interior of the cooking vessel and are typically mounted on the support structure so that the source of heat is dispersed and distributed enabling a previously unavailable level of heat precision and control in the preparation of food. Alternatively, ferrous elements are placed outside of the vessel. Yet, alternatively, ferrous elements are place inside of the vessel and outside thereof—both of which may be used to heat food held by the vessel.

Ferrous and similar pieces of metal of varying shapes, sizes, number, and magnetic/conducting properties are distributed throughout the vessel. Each becomes a source of heat so that the food is cooked according to the specifications of the preparer. No longer does the heat travel only from the enveloping heated vessel, (or from the flame which is directed at the food). The heat can travel from a number of separate sources, from inside the cooking vessel, therefore enabling a new level of uniformity—or differentiation—as the case (and desire) may be.

A method of forming a cooking apparatus includes providing a vessel having an inside surface, an outside surface, and a hollow area that is configured to receive food. The method also includes forming a first plurality of ferrous elements to be disposed on an outside of the vessel. The method also includes forming a second plurality of ferrous elements to be disposed in the hollow area of the vessel. The first plurality of ferrous elements and the second plurality of ferrous elements are configured to be heated by electromagnetic radiation from an electromagnetic radiation source, and the first plurality of ferrous elements and the second plurality of ferrous elements are configured to transfer heat to food located in the vessel. The method further includes providing a controller to control movement of at least the first plurality of ferrous elements.

BRIEF DESCRIPTION OF DRAWINGS

Additional features and advantages of the present invention will be made clear in the following specification taken with the drawings in which.

DETAILED DESCRIPTION

Figure 1:
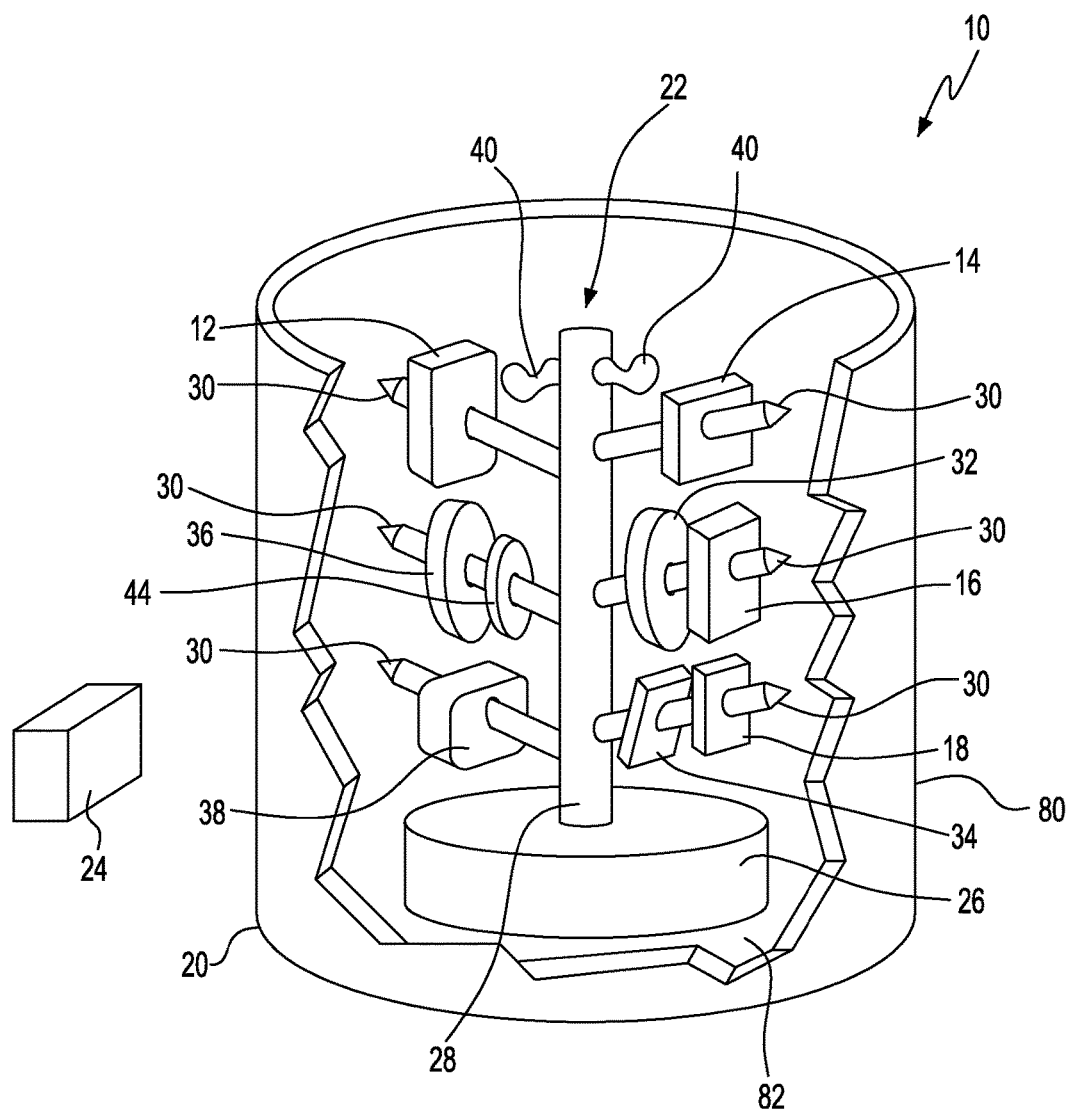
FIG. 1 is an overall perspective view of the induction cooking apparatus according to the present invention with the apparatus shown in use and with a portion of the apparatus shown broken away to reveal details of internal construction.

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

With reference to the drawings there is shown in FIGS. 1-7 an induction cooking apparatus 10 made in accordance with the present invention, with the apparatus 10 shown in use cooking food items 12, 14, 16, 18. The apparatus 10 includes a cooking vessel 20, a support structure 22 and a source of electro-magnetic radiation 24. The source of electro-magnetic radiation 24 is of conventional construction which is well known in the art and, accordingly, the source of electro-magnetic radiation 24 is represented schematically in FIG. 1 by a rectangular prism. The source of electro-magnetic radiation 24 is capable of producing radiation in a range of power levels and a range of frequencies. For example, a source electromagnetic radiation may consist of a coil of copper having an alternating electric current flowing therethrough in order to produce an oscillating magnetic field. The magnetic field induces an electric current in the ferrous elements and heat generated by resistance heats food that is in thermal communication with the ferrous elements. The source of electromagnetic radiation is interchangeably referred to as an "electromagnetic source," an "electromagnetic energy source," and an "electromagnetic radiation source" herein.

The cooking vessel 20 is a container of generally conventional design and may be made of a non-ferrous material or, alternatively, of a non-ferrous material with a ferrous bottom surface to facilitate two modes of cooking Induction cooking is accomplished according to the present invention and also conventional cooking may be accomplished using a conventional stove or cook top. As shown in FIG. 1, the cooking vessel 20 has a generally cylindrical side wall 80 and a generally flat bottom 82. The side wall 80 is made of a non-ferrous material and the flat bottom 82 may be either a ferrous or non-ferrous material.

The source of electromagnetic radiation 24 may be spaced apart from the container 20 as is shown in FIG. 1 or alternatively it may be attached to the generally cylindrical side wall of the container. A plurality of sources 24 of electromagnetic radiation may be utilized.

The support structure 22 is a key element of the present invention and is preferably made of a non-ferrous material which is capable of withstanding typical cooking temperatures. Appropriate materials for the support structure 22 have been found to be glass, aluminum and certain woods.

Figure 2:
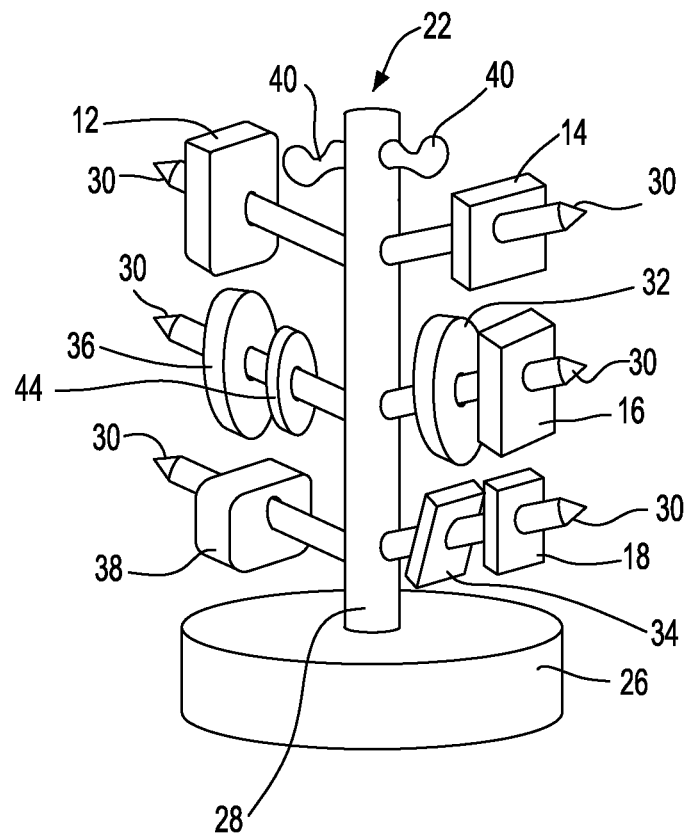
FIG. 2 is a perspective view of the support structure shown in FIG. 1 with the support structure shown removed from the cooking vessel.

As is best shown in FIGS. 1 and 2, the support structure 22 includes a base 26 and a central column 28 which projects upwardly from the base 26.

Along the central column 28 there is a plurality of branches 30 or hooks 40 on which ferrous elements 32, 34, 36, 38 or similar materials may be removably affixed according to the wishes of the person preparing the food. The food being cooked may be affixed to selected branches 30 by allowing the end of the branch 30 to pierce the solid food. Alternatively, ferrous elements 32, 34, 36, 38 are permanently attached to central column 28.

Figure 4:
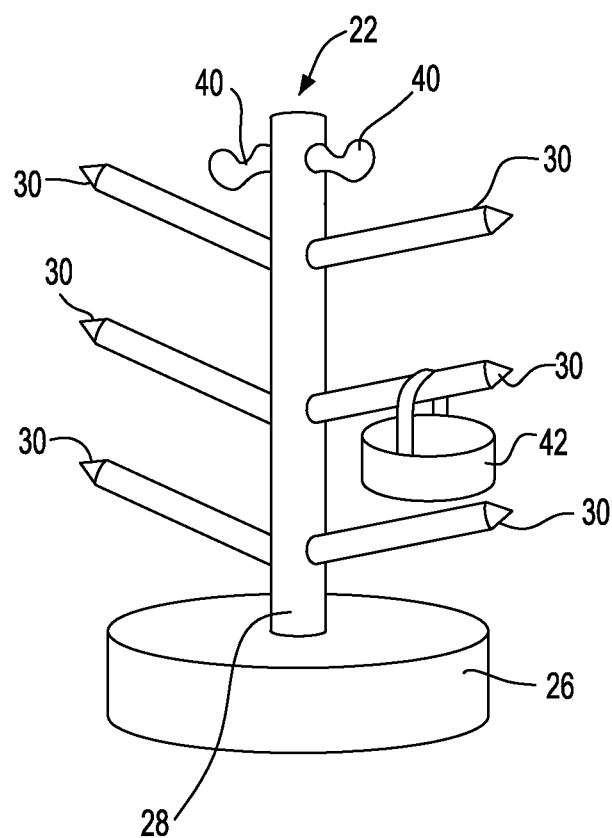
FIG. 4 shows a pail mounted on the support structure.

A ferrous or non-ferrous dish or pail 42 may be hung from a selected branch as shown in FIG. 4. Food of a loose or soft or liquid consistency may be placed in the pail 42 for the purpose of cooking During use, the ferrous elements 32, 34, 36, 38, which are hung from or attached to selected branches 30 of the support structure 22, are heated by induction in order to create the desired heating pattern. The ferrous elements 32, 34, 36, 38 may be of various shapes and number according to the cooking application. Included in these shapes are rectangular, circular, ellipsoidal, triangular and regular and irregular geometrical shapes. The size of the ferrous elements 32, 34, 36, 38 and the relative proximity of the ferrous elements 32, 34, 36, 38 to the food being cooked may be adjusted or varied by a user in order to create a desired heating pattern.

Figure 3:
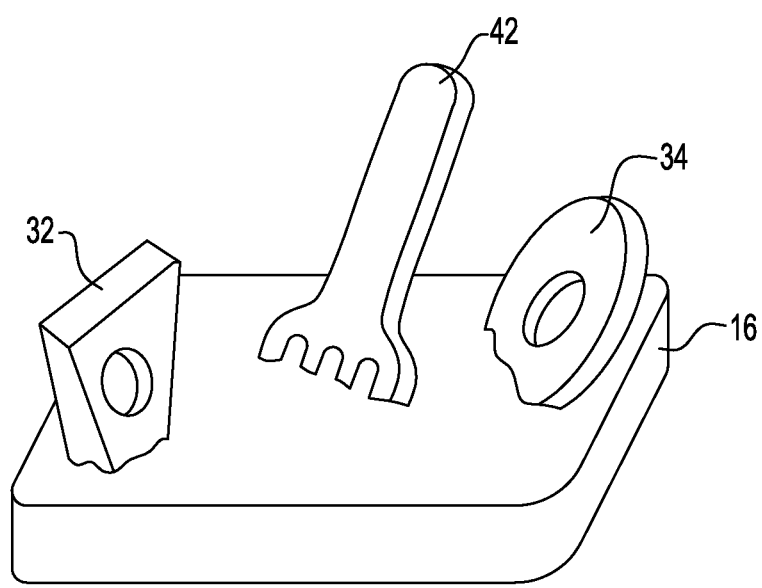
FIG. 3 is an alternative embodiment of the invention in which ferrous elements are inserted directly into food.

The ferrous element may also have various configurations including a household item such as an eating utensil 42 as is shown in FIG. 3.

During use, the source of electro-magnetic energy 24 creates heat within the ferrous elements 32, 34, 36, 38.

When a ferrous cooking vessel is used the electro-magnetic radiation source can also create heat in the cooking vessel 20.

The ability to vary the size, shape and proximity of the ferrous elements 32, 34, 36, 38 to the food being cooked results in a previously unavailable level of precision and control in the preparation of food.

In another embodiment shown in FIG. 3, solid foods for which structures and hanging ferrous elements are unsuitable, elements 32, 34, 42 are provided with sharp edges which can be stuck into the food at various places—or inserted into folds at specified locations. The heating (and cooking) will be precise, and once the process is over, the elements 32, 34, 42 are readily removed.

Figure 5:
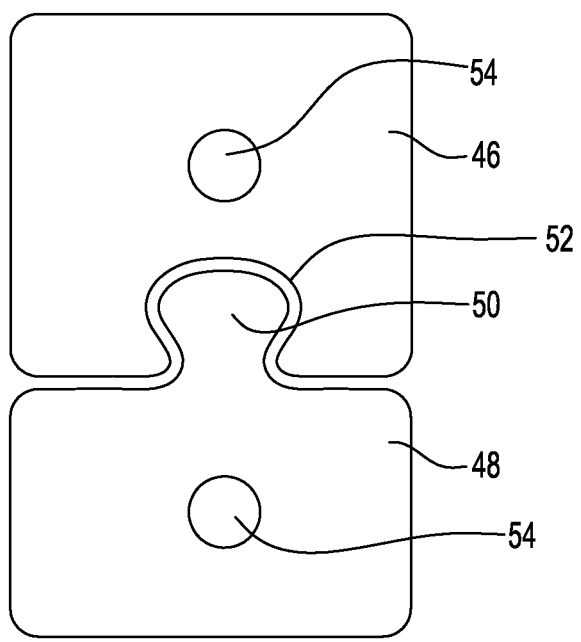
FIG. 5 sows a pair of ferrous elements joined together.

The ferrous elements can have different sizes, shapes compositions and magnetic properties. The ferrous element may be connected one to another either by mounting two or more ferrous elements 36, 44 on a single branch of the support structure as shown in FIG. 4 or alternatively providing a snap together or link together interface as shown in FIG. 5. Ferrous elements 46, 48 can be easily attached and detached as is shown in FIG. 5 ferrous element 48 includes a projecting tongue 50 while ferrous element 46 includes a receptacle 52 which accepts the tongue 50. Ferrous elements 46, 48 include apertures 54 for attachment to a branch 30.

The ability to vary the number, shape orientation and proximity to the food during the cooking process enables the user to achieve a previously unobtainable level of control and precision in the preparation of food.

The present invention also includes an induction cooking oven which is generally similar to the cooking vessel 20 and which is generally rectangular and box-like in configuration having a top, a bottom and four side walls with food disposed on ferrous or non-ferrous racks mounted within the oven. Ferrous elements 32, 34, 42 are inserted into the food as previously described. A plurality of sources of electro-magnetic radiation 24 are disposed on the top wall and the four sidewalls.

The present invention provides a method for induction cooking which includes the following steps:

1. Placing a plurality of ferrous elements in proximity to food;

2. Subjecting the ferrous element and the food to electro-magnetic radiation, thereby enabling the electro-magnetic energy to heat the ferrous elements and allowing the heated ferrous element to transfer heat to the food.

In addition, the present invention provides another method for induction cooking which includes the following steps:

1. Placing a plurality of ferrous elements in an area that is external to a cooking vessel;

2. Subjecting the ferrous element and the food to electro-magnetic radiation, thereby enabling the electro-magnetic energy to heat the ferrous elements and allowing the heated ferrous element to transfer heat to the vessel and/or food.

In addition, the present invention provides another method for induction cooking which includes the following steps:

1. Inserting at least one ferrous element into food;
2. Subjecting the ferrous element and the food to electromagnetic radiation thereby enabling the electro-magnetic energy to heat the at least one ferrous element by induction and allowing the heated ferrous element to transfer heat to the food.

The embodiments set forth above are directed to a cooking vessel having a plurality of ferrous members mounted on a support structure disposed in the hollow or cavity of the vessel. The various ferrous members are heated by an electromagnetic energy source and the resultant output heat is used to heat the contents of the vessel. However, it will be understood by those of ordinary skill in the art that ferrous elements may be placed external to the cooking vessel and which serve the purpose of heating food within the vessel. External elements may be positioned above, below and/or on the side of the cooking vessel. Such external ferrous elements are positioned to be in thermal communication with food located in the vessel. External ferrous elements may be provided in addition to internal ferrous elements.

For example, in one embodiment of the invention, electromagnetic energy sources may be positioned in any of various locations outside of a cooking vessel. The electromagnetic energy is directed to a ferrous vessel or to ferrous members external to the vessel.

Figure 6:
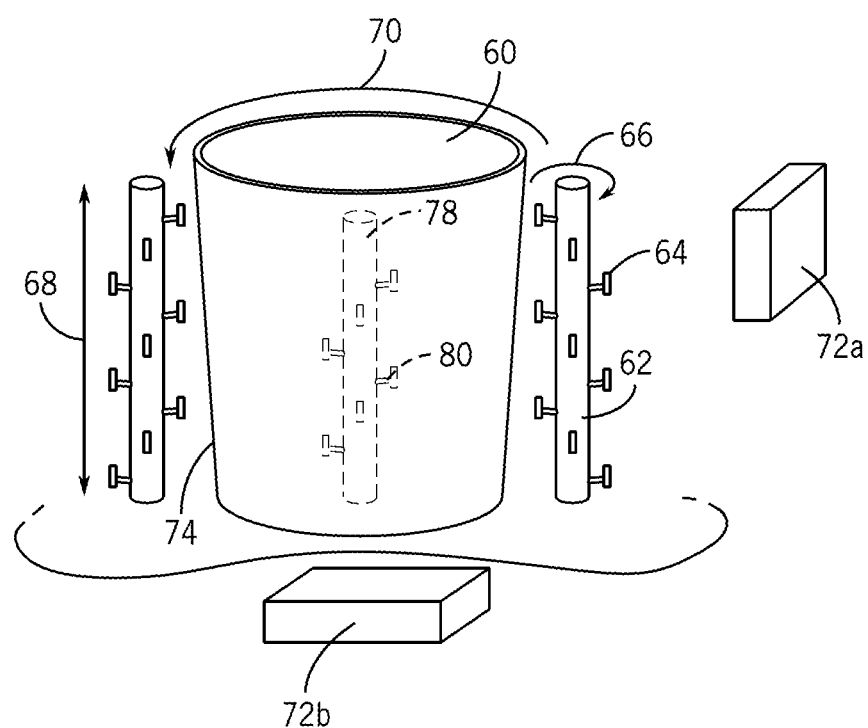
FIG. 6 shows a front view of an induction cooking apparatus having ferrous elements disposed externally to the cooking vessel according to an embodiment of the invention.

FIG. 6 shows a cooking vessel 74 having one or more support columns 62 positioned near the outside walls thereof. Support columns 62 have one or more ferrous elements 64 mounted thereon. The support members 62 are shown oriented with their longitudinal axes substantially parallel to the walls of the vessel, but other orientations are possible in other embodiments of the invention. Moreover, although two support members 62 are shown, the invention is not limited to two external support members 62 and any number of support members 62 are within the teaching of the invention.

In one embodiment of the invention support member 62 is rotatable about its longitudinal axis (in the direction indicated by arrow 66), for example by way of an associated motor.

Alternatively or additionally support member 62 is movable in an upward and downward direction with respect to the floor of the vessel (as indicated by arrow 68), for example by way of a linear motion track or a bidirectional motor.

Still in another embodiment of the invention, the vessel itself is rotatable (e.g. by way of a motor driven roundtable) with respect to one or more support columns (as indicated by arrow 70).

Electromagnetic radiation emanating from electromagnetic energy sources 72a and/or 72b is used to heat either a cooking vessel, ferrous elements in or near the vessel or both. In the example shown in FIG. 6, electromagnetic energy source 72a or 72b directs radiation at the ferrous elements mounted on support member 62 and it thereby causes heat to be generated. The generated heat is used to warm food located in the vessel which is in thermal communication with the ferrous elements 64. Food is introduced into the vessel through opening 60. The vessel may have a corresponding cover (not shown) that is used to cover the vessel during cooking It will be understood that more than one electromagnetic energy source may be provided in different embodiments of the invention. For example, FIG. 6 shows a first electromagnetic source 72a positioned to the side of cooking vessel 74 and a second electromagnetic source 72b is positioned below cooking vessel 74. It will be understood that the number of electromagnetic sources or the placements thereof shown in FIG. 6 are exemplary and more or less than two sources may be provided and electromagnetic sources may be positioned in various locations in different embodiments of the invention.

It will be understood that while the vessel of the invention may be of a variety of materials, it can also be ferrous in nature so that it too can be heated by induction. Ferrous elements can be mounted on the walls of the vessel itself or they may be placed in or near the vessel (e.g. an internal support column 78 with ferrous members 80 branching off thereof—as shown in FIG. 6).

In one embodiment of the invention, movable support members 62 which have ferrous elements 64 mounted thereon may be coupled to a heat sensor inside the vessel. The heat sensor will detect areas of the vessel that are cooler with respect to other areas and it will direct ferrous elements to such cooler areas to achieve more targeted heating. Alternatively, the ferrous elements may be moved randomly or at programmed intervals to insure uniform heating.

It will be understood by those of ordinary skill in the art that a cooking vessel 74 may have ferrous elements 80 positioned in the interior thereof, or ferrous elements 64 positioned in the exterior thereof—or a combination of both. For example, FIG. 6 shows a vessel 74 having ferrous elements 80 attached to a column 78 in the hollow of the vessel. Additional, ferrous elements 64 are mounted on columns 62 outside of the vessel. In one embodiment of the invention, ferrous elements 64 and ferrous elements 80 are independently controllable. For example, electromagnetic radiation source 72a may be used to heat ferrous elements 64 on the outside of the vessel and electromagnetic radiation source 72b may be used to heat ferrous elements 80 in the inside of the vessel. In one mode of cooking only electromagnetic radiation source 72b is activated to heat ferrous elements 80, however, in a second mode of heating both electromagnetic radiation sources 72b and 72a are utilized to respectively heat ferrous elements 80 and 64.

Although in the embodiment shown in FIG. 6, there are ferrous elements both inside of and outside of the cooking vessel--it will be understood that ferrous elements may be mounted solely inside or solely outside of a cooking vessel in different embodiments of the invention. In addition, it will be understood that in some embodiment of the invention, ferrous elements may be permanently attached to a supporting structure, whereas, in other embodiments of the invention, ferrous elements may be selectively attached to support structures or to the vessel in a non-permanent manner.

Figure 7:
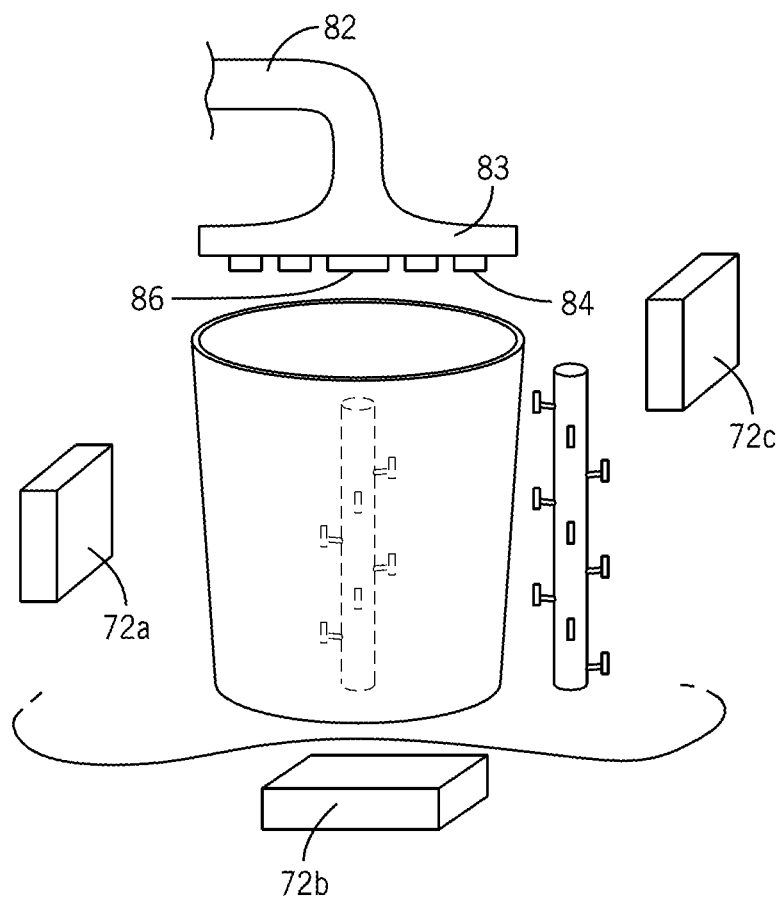
FIG. 7 shows a front view of induction cooking apparatus having external ferrous elements, both above and along the side wall of the cooking vessel according to an embodiment of the invention.

FIG. 7 shows an alternate embodiment of the invention whereby a support member 82 atop of the vessel is provided with an arm 83 which has ferrous elements 84 and/or an electromagnetic source 86 affixed thereto. Arm 83 is positioned above of the opening 60 of the vessel. Ferrous elements 84 receive electromagnetic radiation from one or more external sources, such as electromagnetic source 72c and thereby radiate heat downward into the vessel. Electromagnetic source 86 radiates and thereby heats ferrous elements either in the vessel or outside of the vessel as described above.

It will be understood by those of ordinary skill in the art, that ferrous elements may be positioned in any of various areas around the walls and/or top of cooking vessel and the invention is not limited to any particular placement or arrangement of ferrous elements outside (or within) a cooking vessel.

The invention claimed is:

1. A method of forming a cooking apparatus comprising:
providing a vessel having an inside surface, an outside surface, and a hollow area that is configured to receive food;
forming a first plurality of ferrous elements to be disposed on an outside of the vessel;
forming a second plurality of ferrous elements to be disposed in the hollow area of the vessel, wherein the first plurality of ferrous elements and the second plurality of ferrous elements are configured to be heated by electromagnetic radiation from an electromagnetic radiation source, and wherein the first plurality of ferrous elements and the second plurality of ferrous elements are configured to transfer heat to food located in the vessel; and
providing a controller to control movement of at least the first plurality of ferrous elements.

2. The method of claim 1, wherein the controller is further configured to control movement of the second plurality of ferrous elements.

3. The method of claim 2, wherein the controller is configured to independently control movement of the first plurality of ferrous elements and the second plurality of ferrous elements.

4. The method of claim 1, wherein the vessel is made from a non-ferrous material.

5. The method of claim 1, further comprising providing a support member that is configured to hold the first plurality of ferrous elements.

6. The method of claim 1, wherein the first plurality of ferrous elements is configured to be positioned on a top of the vessel.

7. The method of claim 1, further comprising providing a food support member for placement within the vessel, wherein the food support member is ferrous, and wherein at least a portion of the food support member is configured to extend into the food such that the food support member cooks the food from within.

8. The method of claim 7, wherein the food support member is configured to rotate within the vessel.

9. The method of claim 1, further comprising providing the electromagnetic radiation source, and wherein the controller is configured to activate the electromagnetic radiation source.

10. The method of claim 1, wherein the electromagnetic radiation source comprises a first electromagnetic radiation source, and further comprising providing the first electromagnetic radiation source and a second electromagnetic radiation source.

11. The method of claim 10, wherein the controller is configured to selectively activate the first electromagnetic radiation source and the second electromagnetic radiation source.

12. The method of claim 1, further comprising providing a heat sensor that is configured to sense a temperature of a plurality of different areas within the vessel.

13. The method of claim 12, wherein the controller is configured to minimize a difference in temperature between the plurality of different areas within the vessel based at least in part on the sensed temperatures.

14. The method of claim 12, wherein the controller is configured to control the movement of the first plurality of ferrous elements based at least in part on the sensed temperatures from the heat sensor.

15. The method of claim 1, wherein a side wall of the vessel is made from a non-ferrous material and a bottom wall of the vessel is made from a ferrous material.

16. The method of claim 1, wherein the second plurality of ferrous elements vary in shape relative to one another.

17. The method of claim 1, wherein the second plurality of ferrous elements vary in size relative to one another.

18. The method of claim 1, wherein at least one of the second plurality of ferrous elements is in the shape of an eating utensil.

19. The method of claim 1, wherein at least one of the second plurality of ferrous elements comprises a pail that is configured to receive liquid food.

20. The method of claim 1, wherein at least two of the second plurality of ferrous elements have a mating interface such that the at least two ferrous elements can be connected to one another.

* * * * *